United States Patent [19]

Klein

[11] Patent Number: 5,267,763
[45] Date of Patent: Dec. 7, 1993

[54] VEHICLE SIDE GUARD

[76] Inventor: Robert J. Klein, 556 Oakdale Dr., Sierra Madre, Calif. 91024

[21] Appl. No.: 986,459

[22] Filed: Dec. 7, 1992

[51] Int. Cl.[5] .............................................. B60R 19/42
[52] U.S. Cl. ................................ 293/128; 293/DIG. 6; 428/31; 248/206.5; 248/309.4; 248/345.1
[58] Field of Search ........ 293/126, 128, 142, DIG. 6; 280/770; 267/140; 24/289, 297, 303; 248/206.5, 309.4, 345.1, 686; 428/31

[56] References Cited

U.S. PATENT DOCUMENTS

| | | | |
|---|---|---|---|
| 4,708,380 | 11/1987 | Cruz | 293/128 |
| 4,726,614 | 2/1988 | Myers et al. | 293/128 |
| 4,871,205 | 10/1989 | Bray | 293/128 |

Primary Examiner—David M. Mitchell
Assistant Examiner—Andrew C. Pike
Attorney, Agent, or Firm—Rapkin, Gitlin & Moser

[57] ABSTRACT

A protective guard for demountable attachment to the side of a vehicle comprising a single panel unit fabricated of a light weight material, such as cellular polystyrene, formed generally in the shape of an elongated triangle having one internal wall section and two approximately equal converging sidewalls. The interior wall is generally flat along the longitudinal edge portions and includes a channel formed down the center from one end of the panel to the other. The end portions of the panel are slightly tapered from a pre-determined point near each end of the panel where the two side walls converge. Imbedded in the interior wall of the panel are a plurality of encapsulated magnets that are used to attach and secure the panel to the vehicle's surface. Each capsule, which is generally conical in shape, includes an annular flange disposed about the wider, open end of the capsule. The opposite, narrower end of the capsule is permanently sealed and supports therein a generally thin disc shaped magnet. The sealed end of the capsule is strategically situated and integrated with the panel so that it remains absolutely flush with the interior wall of the panel to ensure that the magnetic force of each magnet is maximized upon the vehicle surface.

6 Claims, 1 Drawing Sheet

VEHICLE SIDE GUARD

BACKGROUND OF THE INVENTION

1. Field of the Invention

The present invention relates generally to a device for guarding vehicles against nicks, scratches and dents and, more particularly to an improved protective panel that can be detachably mounted against the side door of a vehicle by magnetic means encapsulated in a protective housing retainably imbedded in the panel.

2. Description of the Prior Art

Devices for protecting the sides of a parked vehicle from dents, scratches and dings are well known in the art. The damage that a vehicle normally suffers in this regard results usually from direct contact with an open door of an adjacently parked vehicle or an unarrested supermarket shopping cart. Plastic or chrome side strips or moldings that are already mounted on the sides of the vehicle when it arrives from the manufacturer or are added to the vehicle afterwards by the dealer or someone else are fastened to the vehicle either for the aesthetic value or as a protective mechanism. Many of these side strips or moldings are designed to give the vehicle a racier appearance, while other types of strips or moldings, usually much larger in size, are provided primarily to guard against damage to the side of the vehicle. Unfortunately, these side moldings are very often too insubstantial in their size or too poorly designed to offer any legitimate protection for the vehicle in this regard. And, because of the size differential among many of the vehicles on the roads these days, the placement of these strips or moldings on the vehicles are not always effective to prevent the damage from occurring. For example, a large or luxury type automobile may incorporate moldings on the sides of its doors that are positioned high above the point of contact of an opening door belonging to a smaller compact vehicle parked alongside.

Detachable door guards in the prior art consist of devices that can usually be purchased from a an automobile or truck dealer, an automobile parts store or, as is becoming increasingly more prevalent, from a car wash business with an auto accessories department. The prior art includes, though may not be limited to, the devices disclosed in the following U.S. Patents:

U.S. Pat. No. 5,072,979 to Swinton discloses a protective device that includes a main panel section and one or more side panel sections hingedly attached to the main panel. Magnets are provided to attach the panels to the side of the vehicle and additional means are used to secure the panels inside the door jam to prevent theft.

U.S. Pat. No. 4,810,013 to Spears discloses a removable door guard comprising two or more light weight, elongated members joined together by an elastic cord or some other suitable mechanism. Hooks at the opposite ends of the elastic cords are used to attach the guard to the door(s).

U.S. Pat. No. 4,127,294 to Cooper discloses a protective bumper consisting of one or more elongated members with suction cups for mounting the bumper on the body of the vehicle. A longitudinal notch is formed along the interior wall to accommodate vehicle side strips or moldings.

U.S. Pat. No. 4,810,015 to McNeil discloses a vehicle body protection apparatus comprising a resilient cloth covered foam rubber pad having a length generally greater than the length of most vehicle doors. A series of magnets are attached along the top and bottom edges of the cloth cover to hold the apparatus to the vehicle surface. Elastic loops are attached to each end of the cover to further secure the apparatus to a hook or some similar device protruding inside the front and back wheel wells.

Additional references disclosing related technology include U.S. Pat. No. 5,050,925 to Brown; U.S. Pat. No. 5,129,695 to Norman II; U.S. Pat. No. 4,530,519 to Marshall; U.S. Pat. No. 5,112,092 to Pucci; U.S. Pat. No. 4,014,583 to Forbes; U.S. Pat. No. 3,540,773 to Settle; U.S. Pat. No. 4,750,767 to Barnett; U.S. Pat. No. 4,707,009 to Barnett and U.S. Pat. No. 4,639,027 to Boyd. These prior art devices have not been well received by the general public. Due to their lack of aesthetic appeal, their failure, in many instances, to adequately protect a vehicle from damage, the difficulty of their attachment to the vehicle's surface and/or the inconvenience involved in their storage, the devices of the prior art have not found the consumer acceptance they apparently sought to achieve.

The device of the present invention is a vast improvement over the prior art as it succeeds in overcoming the prior art limitations in a variety of ways. The device is extremely easy to handle and attach to the side of a vehicle due primarily to the use of a series of encapsulated magnets imbedded in the panel and mounted flush with the panel's interior surface. More specifically, the use of a magnet encapsulated in a generally tubular or conical shaped housing provides protection for the vehicle's painted metal surface against damage that could result from contact with the metal magnet and the means to permanently retain the magnet in the device of the present invention without the risk of the magnet coming lose and disengaging from the panel. Unlike so many of the complex devices of the prior art, the present invention can easily and quickly be attached to and removed from the side of a vehicle using only one hand in the process.

Other improvements of the present invention include utilizing the cellular polystyrene material used to form the panel component as a filler to pack the back section of each housing and any gap openings existing on either side of the magnet to ensure that each magnet is permanently fixed and held in an immovable condition inside the housing. The tapered end portions of the panel assist in maintaining the device securely against the side of a vehicle operating at high speeds on those rare occasions when the vehicle owner or driver may forget to remove and store the device before the vehicle is driven away.

SUMMARY OF THE INVENTION

The present invention provides a protective guard for demountable attachment to the side of a vehicle. The invention comprises a single panel unit fabricated of a light weight material, such as cellular polystyrene, formed generally in the shape of an elongated triangle having one internal wall section and two approximately equal converging sidewalls. The interior wall is generally flat along the longitudinal edge portions and includes a channel formed down the center from one end of the panel to the other. The end portions of the panel are slightly tapered from a pre-determined point near each end of the panel where the two side walls converge. Imbedded in the interior wall of the panel are a plurality of encapsulated magnets that are used to attach and secure the panel to the vehicle's surface. Each capsule is generally conical or tubular in shape. An annular flange is disposed about the open end of the capsule, which is the wider end of the conical embodiment. The other end of the capsule is permanently sealed. A generally thin disc shaped magnet is placed inside the capsule against the sealed end. The sealed end is strategically situated so that it remains absolutely flush with the interior wall of the panel to ensure that the magnetic force of each magnet is maximized upon the vehicle surface. The sealed capsule also prevents against any moisture invasion, which could cause the magnet to rust and lose its effectiveness. Each magnet is held permanently fixed against the interior wall of the capsule's sealed end by virtue of the force exerted by the cured cellular polystyrene material packed in from behind. During the panel formation process, the polystyrene serves not only to form the panel, but also acts as a filler material that flows inside each capsule through the opening in the back end to envelop and tightly pack the magnet from behind. The polystyrene also completely envelops the exterior walls of the capsule and surrounds the annular flange to ensure that each capsule is permanently fixed in its designated place to preclude the capsule from coming lose and separating from the panel.

Accordingly, it is an object of the present invention to provide a side guard panel for removable attachment to a vehicle that includes a series of spaced apart magnets that are individually encapsulated in generally conical or tubular shaped housings permanently imbedded through the interior surface of the panel.

Another object of the present invention is to provide a side door panel for removable attachment to a vehicle that includes a series of magnets encapsulated in corresponding conical or tubular shaped housings circumscribed at one end thereof by an annular flange embedded relatively deep into the panel to ensure that each housing is permanently fixed inside.

Yet another object of the present invention is to provide a side guard panel for removable attachment to a vehicle that includes a series of spaced apart magnets that are individually encapsulated within conical or tubular shaped housings having a sealed end wall disposed evenly with the interior surface of the panel to protect the vehicle surface from damage resulting from direct physical contact with the metal magnet and to ensure the panel a tight mount to the vehicle surface.

Still yet another object of the present invention is to provide a side guard panel that includes a series of spaced apart generally conical or tubular shaped capsules containing disc shaped magnets enveloped and held permanently inside each of the capsules by some of the same cellular polystyrene or other suitable material used to form the panel.

Still yet another object of the present invention is to provide a side guard panel for removable attachment to a vehicle that includes tapered end portions formed to minimize wind resistance and assist in retaining the panel securely against the vehicle's surface in the event that the panels are inadvertently left attached to the vehicle and the vehicle is driven away and operated at accelerated speeds.

Yet another object of the present invention is to provide a side guard panel for removable attachment to a vehicle that includes an elongated channel formed longitudinally along the entire interior wall of the panel to accommodate the vehicle's side trim or molding and ensure a proper and secure mount for the panel to the vehicle's surface.

Still yet another object of the present invention is to provide a side guard panel for removable attachment to a vehicle that is easy to use and economical to manufacture.

Other objects and advantages of the present invention will become apparent in the following specifications when considered in light of the attached drawings wherein the preferred embodiment of the invention is illustrated.

DETAILED DESCRIPTION OF THE PREFERRED EMBODIMENT

Figure 1:
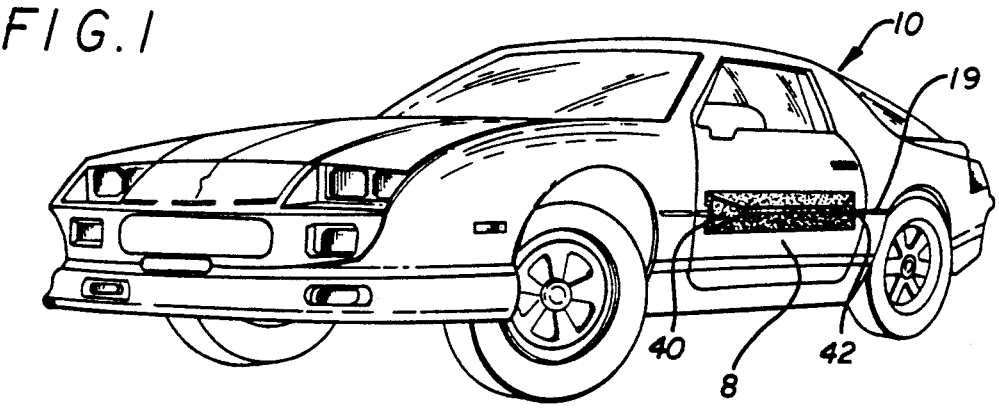
FIG. 1 is a perspective pictorial view of an automobile with a vehicle side guard constructed in accordance with the present invention mounted on the side of the vehicle.
Figure 2:
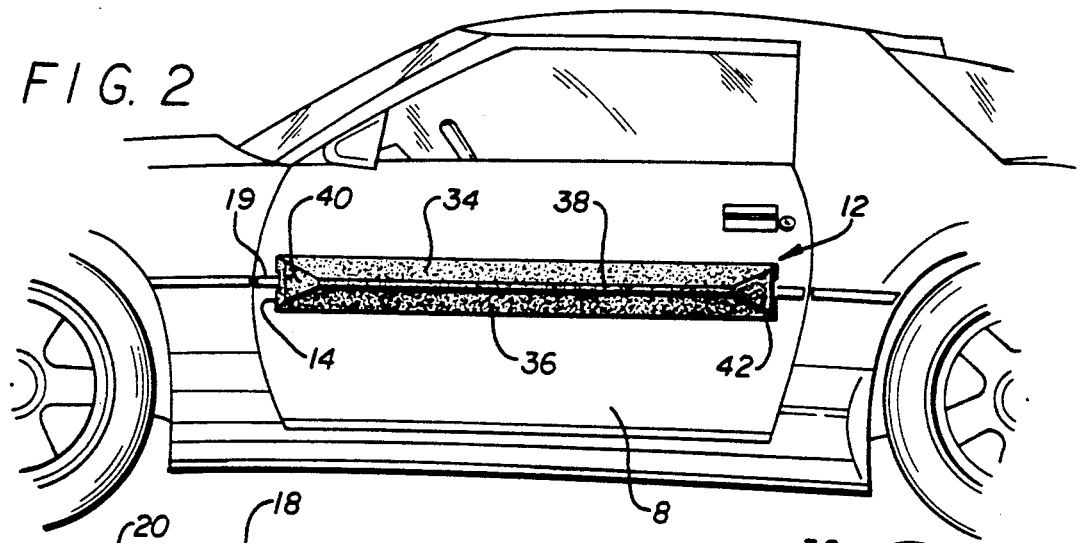
FIG. 2 is a partial pictorial side elevational view of an automobile with a vehicle side guard constructed in accordance with the present invention mounted on the side of the vehicle.
Figure 3:
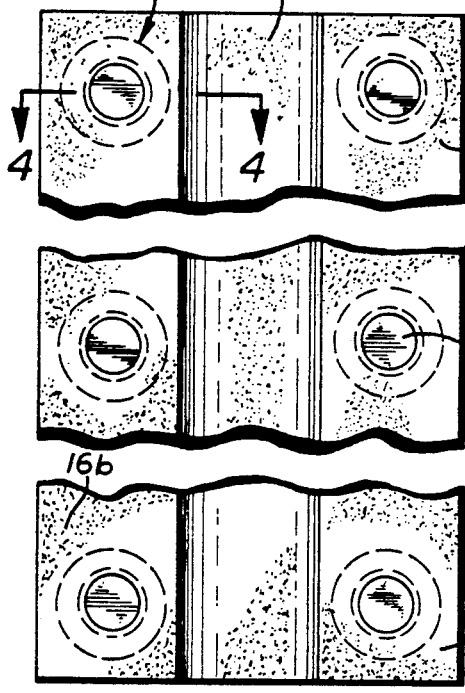
FIG. 3 is a partially fragmented perspective view of the interior wall of the device of the present invention depicting the location and arrangement of the longitudinal center channel and the magnetic components.
Figure 4:
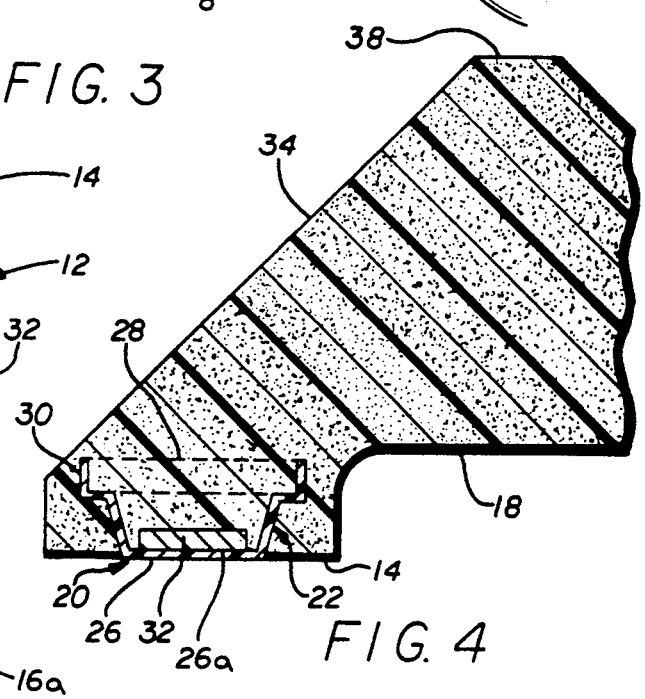
FIG. 4 is a cross-sectional view of the device of the present invention taken along line 4—4 of FIG. 3.

Referring to the drawings, the generally elongated, triangular shaped device or vehicle side guard of the present invention is designated generally as 12 and is shown mounted on the door or side surface 8 of an automobile 10. Cellular polystyrene or some other suitable material is used to fabricate the side guard 12. The dimensions of side guard 12 may vary, though they usually range from two (2) to three (3) feet in length, five (5) to eight (8) inches in width and two and one-half (2½) to three and one-half (3½) inches in depth. Side guard 12 includes an elongated interior wall 14 having corresponding side edge portions 16a, 16b. Disposed down the approximate center of interior wall 14 is an elongated channel 18 for accommodating side molding 19 attached along the side of the automobile 10. Extending outwardly from the interior wall 14 are first and second side walls 34, 36 converging to a relatively narrow, flat longitudinal section 38. Formed integrally with first and second side walls 34, 36 at the opposite ends of side guard 12 are first and second tapered end portions 40, 42.

A series of magnet assemblies 20 are placed at various locations along the interior wall 14 for use in attaching the side guard 12 to the vehicle's surface 8. Each assembly 20 includes a generally conical shaped capsule 22, which is made of plastic or some other suitable material, and a generally thin, disc shaped magnet 32 disposed inside. Capsule 22 has a sealed end 26 and a open end 28, which is generally larger in diameter than sealed end 26. Magnet 32 is generally smaller in diameter than sealed end 26. Surrounding end 28 and integrally formed therewith is annular flange 30. Alternate embodiments of the invention include a generally tubular shaped capsule (not shown).

In a typical application of the present invention, the side guard 12 is fabricated using any conventional type of injection or form molding process. Before the polystyrene material, which is used here only as an example, is injected into the panel mold, a series of capsules 22 are arranged at certain strategic locations inside the mold. A magnet 32 is then placed inside each capsule 22 against the inside wall 26a of sealed end 26. When the pre-cured polystyrene is injected into the mold, it eventually flows through the end 28 into the empty space inside each capsule 22. When the entire capsule fills up with the polystyrene, the magnet 32 is completely enveloped on three sides. There it will remain permanently fixed when the polystyrene material cures. The exterior sections of capsule 22, including the annual flange 30, are also completely enveloped by the pre-cured polystyrene material to ensure, when the curing process is complete, that the capsule 22 will remain permanently fixed. The conical shape of the capsule 22 and the annular flange 30 combine to ensure that the capsule, though more specifically, the magnet 32 inside, will not come loose and separate from the interior wall of the side guard 12. In the embodiment utilizing the generally tubular shaped capsule, the annular flange 30 acts alone to ensure that the encapsulated magnet will not separate from the panel. The capsule 22 also provides protection for the vehicle's painted metal surface that could result from any direct contact with the metal magnet.

One or more side guards 12 may, as desired by the driver, be attached to the side surface 8 of an automobile 10 in a manner that will effectively accommodate the side molding 19. In the event that the driver inadvertently forgets to remove the side guard from the vehicle before it is driven away, the tapered end portions 40, 42 will serve to assist in holding the side guards relatively tightly against the vehicle surface. The tapered end portions 40, 42, though more importantly the specific end portion oriented towards the direction of the wind, will act to cut the wind resistance and provide a surface against which the force of the wind will exert itself to keep the panel pressed firmly against the vehicle when the vehicle is accelerating.

Other objects and advantages of the present invention will become apparent in the following specifications when considered in light of the attached drawings wherein the preferred embodiment of the invention is illustrated.

I claim:

1. A protective apparatus provided for removable attachment to the side of a vehicle for preventing dents, nicks and dings, comprising:

an elongated triangular shaped panel having an interior wall, first and second side walls converging to a narrow, flat elongated edge portion and first and second end sections; and, a plurality of magnetic devices incorporated into the interior wall of said panel for removably attaching the panel to the side of the vehicle, each of said magnetic devices being encapsulated in individual housings permanently imbedded in said interior wall, each of said housings comprising a sealed first end wall, an opening at the end of said housing opposite said first end wall, and an annular flange surrounding and integrally formed with said opening for securably retaining said housing within said panel.

2. The invention of claim 1 wherein said panel is comprised of cellular polystyrene.

3. The invention of claim 1 wherein the first and second end sections of said panel each include a tapered portion located along the flat edge portion.

4. The invention of claim 1 wherein each of said individual housings is conically shaped.

5. The invention of claim 1 wherein each of said magnetic devices is relatively thin and disc shaped.

6. A protective apparatus provided for removable attachment to the side of a vehicle for preventing dents, nicks and dings, comprising:

an elongated panel having an interior wall, first and second side walls converging to a narrow, flat elongated edge portion and first and second end sections; and, means in the form of a plurality of magnetic devices incorporated into the interior wall of said panel for removably attaching the panel to the side of the vehicle, each of said magnetic devices being encapsulated in individual housings permanently imbedded in said interior wall, each of said housings comprising a sealed first end wall, an opening at the end of said housing opposite said first end wall, and an annular flange surrounding and integrally formed with said opening for securably retaining said housing within said panel.

* * * * *